(12) United States Patent  
Hwang et al.

(10) Patent No.: US 8,292,020 B2
(45) Date of Patent: Oct. 23, 2012

(54) AUTOMATIC MOVING APPARATUS FOR PRE-CRASH HEADREST

(75) Inventors: Su Hwan Hwang, Hwaseong-si (KR); Bong Joon Lee, Hwaseong-si (KR); Eun Soo Kim, Gyunggi-Do (KR); Gil Ju Kim, Hwaseong-si (KR); Jun Yeol Heo, Suwon-si (KR); Jong Kweon Pyun, Suwon-si (KR); In Ho Lee, Hwaseong-si (KR); Seung Jai Kim, Yongin-si (KR); Do Hyoung Kim, Yongin-si (KR); Sang Nam Park, Cheonan-si (KR); Dong Gi Kim, Osan-si (KR); Jin Young Nam, Suwon-si (KR)

(73) Assignees: Hyundai Motor Company, Seoul (KR); Dymos Inc., Seosan-Si (KR)

( * ) Notice: Subject to any disclaimer, the term of this patent is extended or adjusted under 35 U.S.C. 154(b) by 161 days.

(21) Appl. No.: 12/956,747

(22) Filed: Nov. 30, 2010

(65) Prior Publication Data

US 2012/0013155 A1    Jan. 19, 2012

(30) Foreign Application Priority Data

Jul. 19, 2010  (KR) .......................... 10-2010-0069331

(51) Int. Cl.
*B60K 28/14*    (2006.01)

(52) U.S. Cl. .................................... 180/282; 297/216.12

(58) Field of Classification Search .................. 180/271, 180/274, 282; 297/216.1, 216.12, 216.14
See application file for complete search history.

(56) References Cited

U.S. PATENT DOCUMENTS

| 6,242,701 | B1 * | 6/2001 | Breed et al. ................... 177/144 |
| 7,407,029 | B2 * | 8/2008 | Breed et al. ................... 180/274 |
| 7,588,115 | B2 * | 9/2009 | Breed ........................... 180/271 |
| 7,604,080 | B2 * | 10/2009 | Breed ........................... 180/274 |
| 8,070,222 | B2 * | 12/2011 | Yamada ..................... 297/216.12 |
| 2010/0314918 | A1 * | 12/2010 | Alexander et al. ....... 297/216.12 |

* cited by examiner

*Primary Examiner* — Faye M. Fleming
(74) *Attorney, Agent, or Firm* — Morgan, Lewis & Bockius LLP

(57) ABSTRACT

An automatic moving apparatus may include a collision prediction sensor, a control unit comparing a value measured by the collision prediction sensor, with a reference value stored in the control unit, and outputting a control signal when it may be determined that the value measured by the collision prediction sensor is higher than the reference value, and a headrest moving unit moving a headrest unit toward a passenger's head before the headrest unit comes into contact with the passenger's head, and including a stay rod connected to the headrest unit, both sides of the stay rod being placed in a vertical direction, tilting device tilting the stay rod forwards or backwards relative to a seatback in response to the control signal of the control unit, and vertical moving device moving the stay rod in a vertical direction in response to the control signal of the control unit.

9 Claims, 6 Drawing Sheets

AUTOMATIC MOVING APPARATUS FOR PRE-CRASH HEADREST

CROSS-REFERENCE TO RELATED APPLICATIONS

The present application claims priority to Korean Patent Application Number 10-2010-0069331 filed on Jul. 19, 2010, the entire contents of which application is incorporated herein for all purpose by this reference.

BACKGROUND OF THE INVENTION

1. Field of the Invention

The present invention relates to an automatic moving apparatus for a pre-crash headrest.

2. Description of Related Art

Generally, a headrest for a vehicle is provided to allow a passenger's head to rest thereon and relax, thus relieving fatigue caused by long driving, or to prevent his or her neck or head from being injured because of the neck bending backwards in the event of a rear-end collision.

As shown in FIG. 1, such a headrest 1 is attached to the top of a seatback 2, thus supporting the head and neck of a passenger. The headrest 1 generally includes a pad which is made of cushioning material, and a stay rod 3 which is connected to the seatback 2.

The stay rod 3 is connected to a seat frame which supports the seatback 2 in such a way as to move up and down. Thereby, the height of the stay rod 3 can be adjusted to suit the height of a passenger.

However, in most general cases except for the case where a passenger is sleeping, the passenger's head is not in close contact with the headrest but is spaced apart from the headrest by a predetermined distance. When a vehicle is involved in a rear-end collision, a passenger's neck and head bend excessively backwards because of a difference in displacement between his or her head and body, so that the neck region may be injured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an automatic moving apparatus for a pre-crash headrest, which predicts a rear-end collision to allow the headrest to approach a passenger's head as closely as possible before the rear-end collision occurs, thus preventing his or her neck from bending backwards in the event of the rear-end collision, therefore minimizing injuries to the neck.

In an aspect of the present invention, the automatic moving apparatus for a pre-crash headrest, may have a collision prediction sensor provided on a rear of a vehicle to predict a rear-end collision, a control unit comparing a value measured by the collision prediction sensor and input to the control unit, with a reference value stored in the control unit, and outputting a control signal when it may be determined that the value measured by the collision prediction sensor may be higher than the reference value, and a headrest moving unit moving a headrest unit toward a passenger's head before the headrest unit comes into contact with the passenger's head when the control signal may be input from the control unit to the headrest moving unit, and having a stay rod connected at an upper end thereof to the headrest unit, both sides of the stay rod being placed in a vertical direction, tilting device tilting the stay rod forwards or backwards relative to a seatback in response to the control signal of the control unit, thus making the headrest unit come closer to the passenger's head, and vertical moving device moving the stay rod in a vertical direction in response to the control signal of the control unit so that an uppermost end of the headrest unit may be not lower than the passenger's head.

The control unit may receive a signal from a head position sensor provided on a front of the headrest unit to provide a position of the passenger's head, thus preventing the headrest unit from coming into contact with the passenger's head, wherein the head position sensor may include a capacitive sensor which varies capacitance depending on a distance between the sensor and the passenger's head.

The tilting device may include a tilting motor driven by the control unit, a tilting lead screw rotatably coupled to the tilting motor in a gear coupling manner, with a thread formed on an outer circumference of the tilting lead screw, a guide part slidably fitted over a vertical part of the stay rod to provide a rotating force of the tilting motor to the stay rod and guide a vertical movement of the stay rod, a hinge shaft secured to the guide part to transmit the rotating force of the tilting motor to the guide part, and a connecting arm fitted at a first end thereof over the tilting lead screw, and fitted at a second end thereof over the hinge shaft to rotate the hinge shaft using a rotating force of the tilting lead screw.

The vertical moving device may include a vertical moving motor fixed to the hinge shaft and driven by the control unit, a vertical moving lead screw rotatably coupled to the vertical moving motor in a gear coupling manner, with a thread formed on an outer circumference of the vertical moving lead screw, and a vertical moving body rotatably engaged at a first side thereof to the vertical moving lead screw to move in a vertical direction by a rotation of the vertical moving lead screw, both side ends of the vertical moving body being coupled to a lower portion of the stay rod to transmit a vertical moving force to the stay rod.

The vertical moving motor may be mounted on the hinge shaft via a mounting bracket, wherein the vertical moving body may be slidably guided by a guide rod which may be placed to the mounting bracket in a vertical direction and slidably inserted into the vertical moving body.

The collision prediction sensor may include a radar sensor.

The headrest moving unit may move the headrest unit so that the headrest unit may be spaced apart from the passenger's head by 1 to 20 mm.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
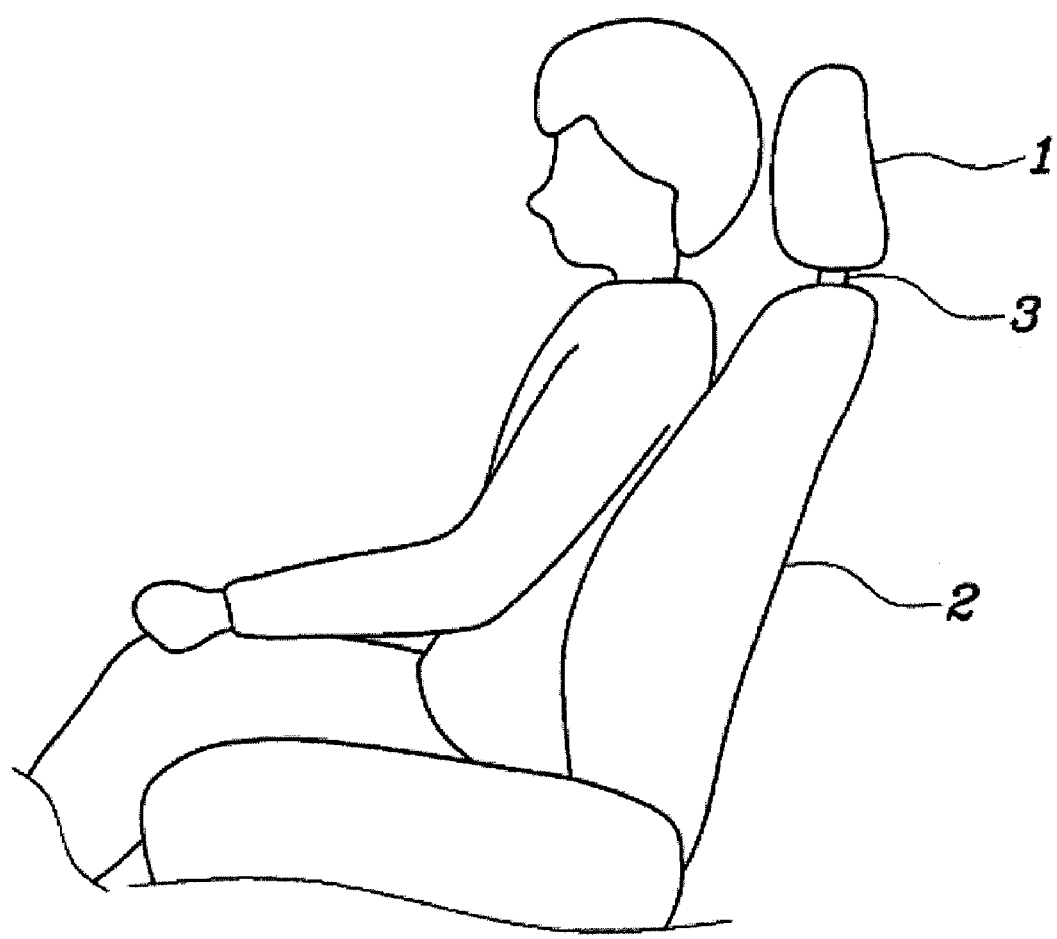
FIG. 1 is a view illustrating a general headrest.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an automatic moving apparatus for a pre-crash headrest according to the exemplary embodiment of the present invention will be described in detail with reference to the accompanying drawings.

Figure 2:
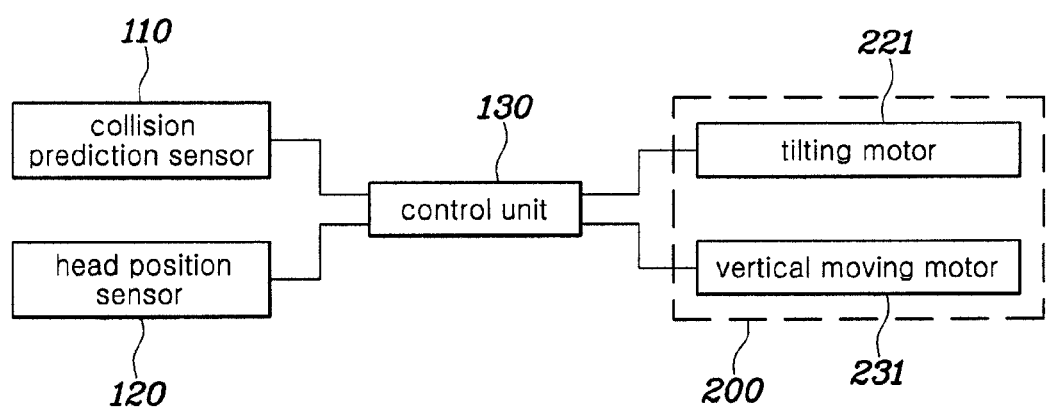
FIG. 2 is a block diagram illustrating the control logic of the present invention.
Figure 3:
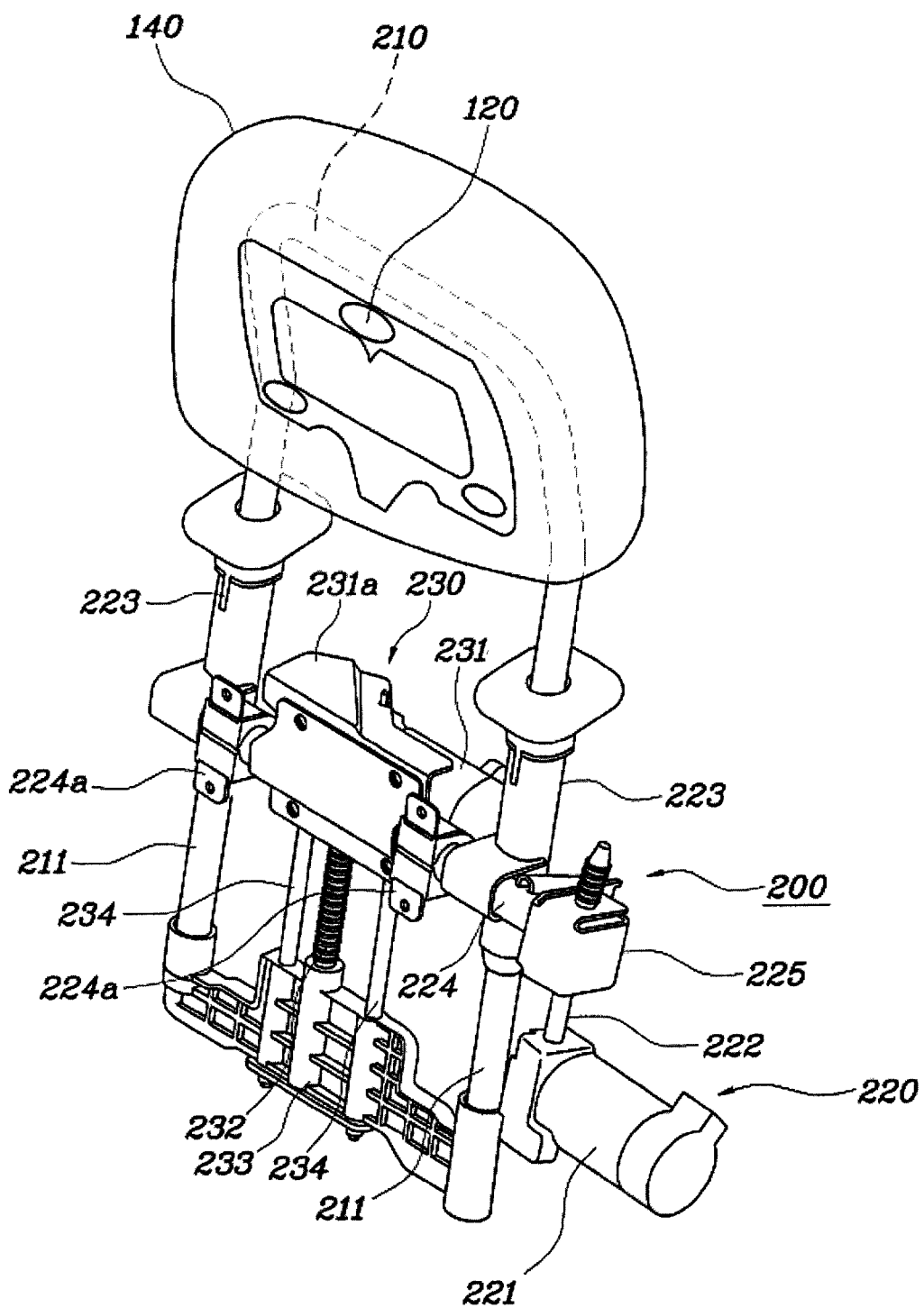
FIG. 3 is a perspective view illustrating an automatic moving apparatus for a headrest mounted to a seat according to an exemplary embodiment of the present invention.
Figure 4:
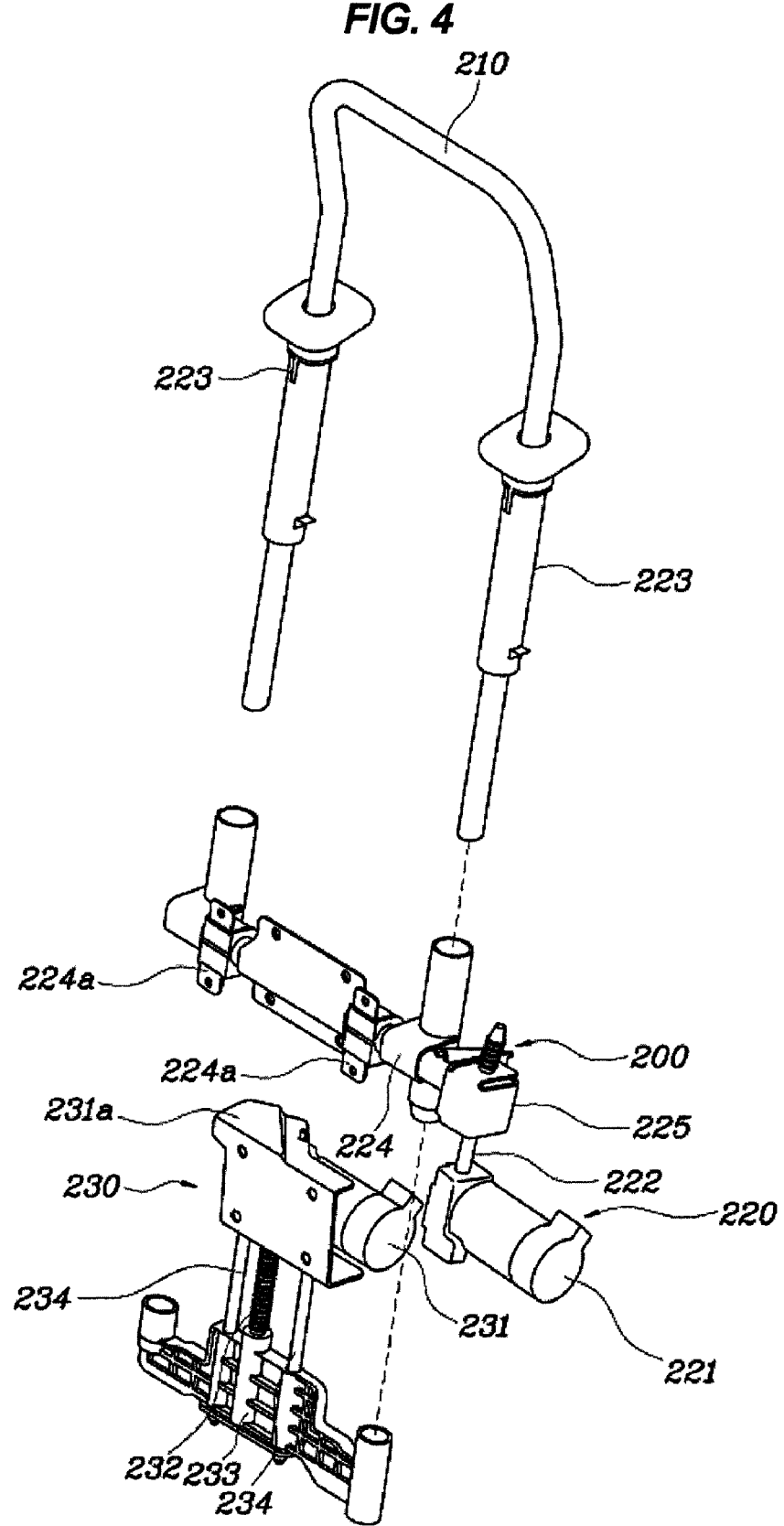
FIG. 4 is an exploded perspective view illustrating respective units of the automatic moving apparatus according to an exemplary embodiment of the present invention.

As shown in FIGS. 2 to 4, the automatic moving apparatus according to an exemplary embodiment of the present invention mainly includes a collision prediction sensor 110, a control unit 130, and a headrest moving unit 200.

The collision prediction sensor 110 is mounted to the rear of a vehicle so as to predict the vehicle being in a rear-end collision. The collision prediction sensor 110 may be installed at any place on the rear of the vehicle, but preferably is mounted on the rear bumper of the vehicle.

The collision prediction sensor 110 is a sensor which detects an object approaching the rear of the vehicle. According to an exemplary embodiment of the present invention, a radar sensor is used as the collision prediction sensor 110. However, the present invention is not limited to the radar sensor and may use an ultrasonic sensor and other sensors.

The control unit 130 compares the measured value of the collision prediction sensor 110 which is input to the control unit 130 with a reference value which is stored in the control unit 130, thus outputting a predetermined control signal only when it is determined that a rear-end collision is about to occur.

That is, the collision prediction sensor 110 transmits data on a distance between a vehicle and an oncoming object (e.g. another vehicle) or the acceleration of the object to the control unit 130. When the control unit 130 compares the measured value of the collision prediction sensor 110 with the reference value programmed therein, and it is determined that there is a strong possibility of a rear-end collision, a predetermined control signal is output.

The headrest moving unit 200 is operated in response to a control signal input from the control unit 130 to the headrest moving unit 200. In response to the control signal of the control unit 130, the headrest moving unit 200 positions an entire headrest unit 140 provided on the top of a seat at a position approaching the passenger's head until shortly before the headrest unit 140 comes into contact with his or her head.

In the event of a rear-end collision, the headrest unit 140 must come as close to a passenger's head as possible so as to stably support his or her head when it is bent backwards. However, the direct contact between the passenger's head and the headrest unit 140 must be avoided. It is preferable that the headrest unit 140 come as close as possible to the head so long as the headrest unit 140 does not come into contact with the head.

Here, the position of a passenger's head must be detected so as to prevent the headrest unit 140 from coming into contact with his or her head. To this end, a head position sensor 120 is provided on the front of the headrest unit 140, and a signal of the head position sensor 120 is input to the control unit 130.

Thus, in the event of the rear-end collision, the control unit 130 operates the headrest moving unit 200 to move the headrest unit 140 near a passenger's head. When it is determined, based on the signal of the head position sensor 120, that the headrest unit 140 has come near the head, the headrest moving unit 200 stops moving to prevent the headrest unit 140 from colliding with the passenger's head.

That is, it is preferable for the headrest unit 140 to be as close as possible to the passenger's head so long as the headrest unit 140 does not collide with the head. Preferably, the headrest moving unit 200 moves the headrest unit 140 so that it is spaced apart from the passenger's head by 1 to 20 mm.

Here, the head position sensor 120 may use several kinds of sensors. But, according to the exemplary embodiment of the present invention, a capacitive sensor which varies capacitance depending on a distance between the sensor and a passenger's head may be used as the head position sensor 120.

Meanwhile, as shown in FIGS. 3 and 4, the headrest moving unit 200 mainly includes a stay rod 210, a tilting device 220, and a vertical moving device 230. The stay rod 210 has on both sides thereof vertical parts 211 which extend in a vertical direction. The headrest unit 140 is mounted to the upper end of the stay rod 210 such that both the stay rod 210 and the headrest unit 140 move integrally.

Further, the tilting device 220 is coupled to the stay rod 210, and tilts the stay rod 210 forwards or backwards relative to the vehicle in response to a control signal of the control unit 130, so that the headrest unit 140 comes near the passenger's head.

The tilting device 220 includes a tilting motor 221, a tilting lead screw 222, guide parts 223, a hinge shaft 224, and a connecting arm 225.

The tilting motor 221 is driven in response to the control signal of the control unit 130, that is, is rotated forwards or backwards in response to the control signal of the control unit 130.

Further, the tilting lead screw 222 is rotatably coupled to the tilting motor 221 in a gear coupling manner. According to the rotating direction of the tilting motor 221, the rotating direction of the tilting lead screw 222 is changed. Threads are formed on the outer circumference of the tilting lead screw 222.

The guide parts 223 are fitted, respectively, over the corresponding vertical parts 211 of the stay rod 210, thus providing a rotating force to tilt the stay rod 210 forwards or backwards, in addition to guiding the vertical movement of the stay rod 210.

The hinge shaft 224 is secured to each of the guide parts 223, thus transmitting the rotating force of the hinge shaft 224 to the guide parts 223.

That is, if the hinge shaft 224 rotates, the rotating force is transmitted to the corresponding guide part 223. The force transmitted to the guide part 223 is transmitted again to the stay rod 210, thus tilting the stay rod 210 forwards or backwards, therefore moving the headrest unit 140 forwards or backwards.

Here, the hinge shaft 224 is secured to a seatback frame via bushing brackets 224a and is freely rotated by the bushing brackets 224a.

Further, the connecting arm 225 functions to transmit the rotating force of the tilting lead screw 222 to the hinge shaft 224. One end of the connecting arm 225 is fitted over the tilting lead screw 222, while the other end is fitted over the hinge shaft 224.

Thus, as the tilting lead screw 222 rotates, the connecting arm 225 is pulled or pushed relative to the hinge shaft 224, thus transmitting the rotating force to the hinge shaft 224. The hinge shaft 224 tilts the guide parts 223 and the stay rod 210.

Meanwhile, the vertical moving device 230 moves the stay rod 210 up and down in response to the control signal of the control unit 130 such that the uppermost end of the headrest unit 140 is not lower than a passenger's head.

In order to more effectively support a passenger's head which is bent backwards in the event of a rear-end collision, the headrest unit 140 moves up such that the headrest unit 140 is not lower than the passenger's head although it is preferable that the headrest unit 140 be higher than a passenger's head so as to stably support his or her head.

Here, the vertical moving device 230 mainly includes a vertical moving motor 231, a vertical moving lead screw 232, and a vertical moving body 233. The vertical moving motor 231 is driven by the control unit 130, and is a two-way motor which permits both forward rotation and backward rotation.

The vertical moving lead screw 232 is rotatably coupled to the vertical moving motor 231 in a gear coupling manner, and has threads on its outer circumference. The rotating direction of the vertical moving lead screw 232 varies depending on the direction of rotation of the vertical moving motor 231.

A side of the vertical moving body 233 is fitted over the vertical moving lead screw 232, so that the vertical moving body 233 is moved vertically by the rotation of the vertical moving lead screw 232. Both ends of the vertical moving body 233 are coupled, respectively, to the vertical parts 211 of the stay rod 210. Thereby, the vertical moving body 233 transmits a vertical moving force from the vertical moving lead screw 232 to the stay rod 210, thus enabling the stay rod 210 to move vertically.

Preferably, the vertical moving motor 231 is mounted on the hinge shaft 224 via a mounting bracket 231a.

Further, in order to more stably move the vertical moving body 233 up and down, as shown in FIG. 3, the vertical moving body 233 is preferably guided by guide rods 234 which are inserted into the vertical moving body 233 and are placed in a vertical direction.

The operation of the present invention will be described below with reference to FIGS. 2, 5, and 6.

Figure 5:
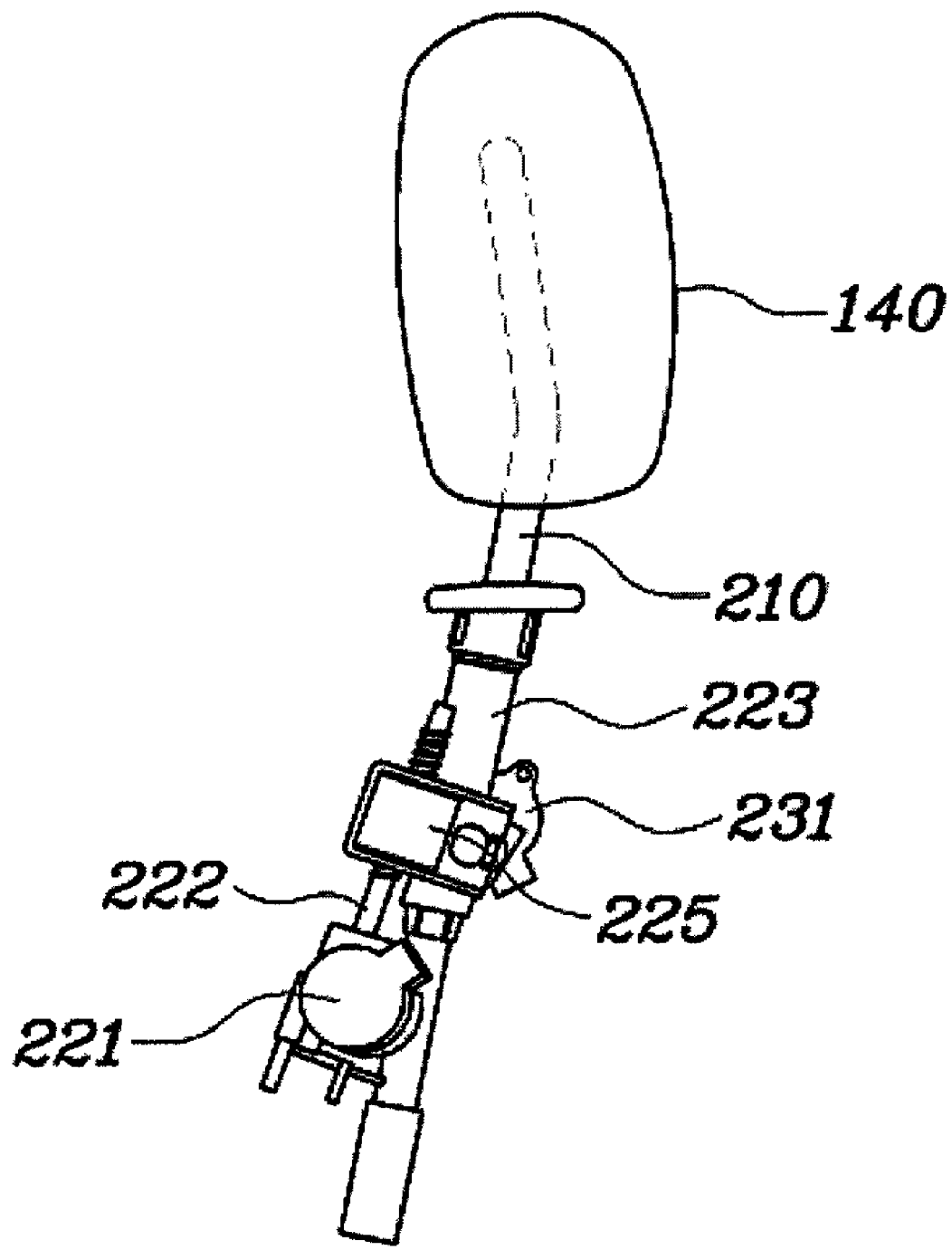
FIGS. 5 and 6 are side views illustrating the operation of the automatic moving apparatus according to an exemplary embodiment of the present invention.

In the state of FIG. 5, when the rear-end collision of the vehicle is predicted by the collision prediction sensor 110, the control unit 130 transmits a control signal to the tilting motor 221 and the vertical moving motor 231, so that the headrest unit 140 provided on the upper end of the stay rod 210 is tilted towards a passenger's head, and simultaneously, is moved up. Consequently, the headrest unit 140 is changed from the position of FIG. 5 to that of FIG. 6.

At this time, the head position sensor 120 provided on the front of the headrest unit 140 detects the position of the passenger's head, thus providing data on the distance between the head and the headrest unit 140 to the control unit 130. The control unit 130 allows the headrest unit 140 to come as close as possible to the passenger's head while preventing the headrest unit 140 from colliding with his or her head, based on the value measured by the head position sensor 120.

If a rear-end collision occurs in such a state, the passenger's head bends backwards. At this time, the headrest unit 140 stably supports the head, thus reducing injuries to a passenger's neck region.

Figure 6:
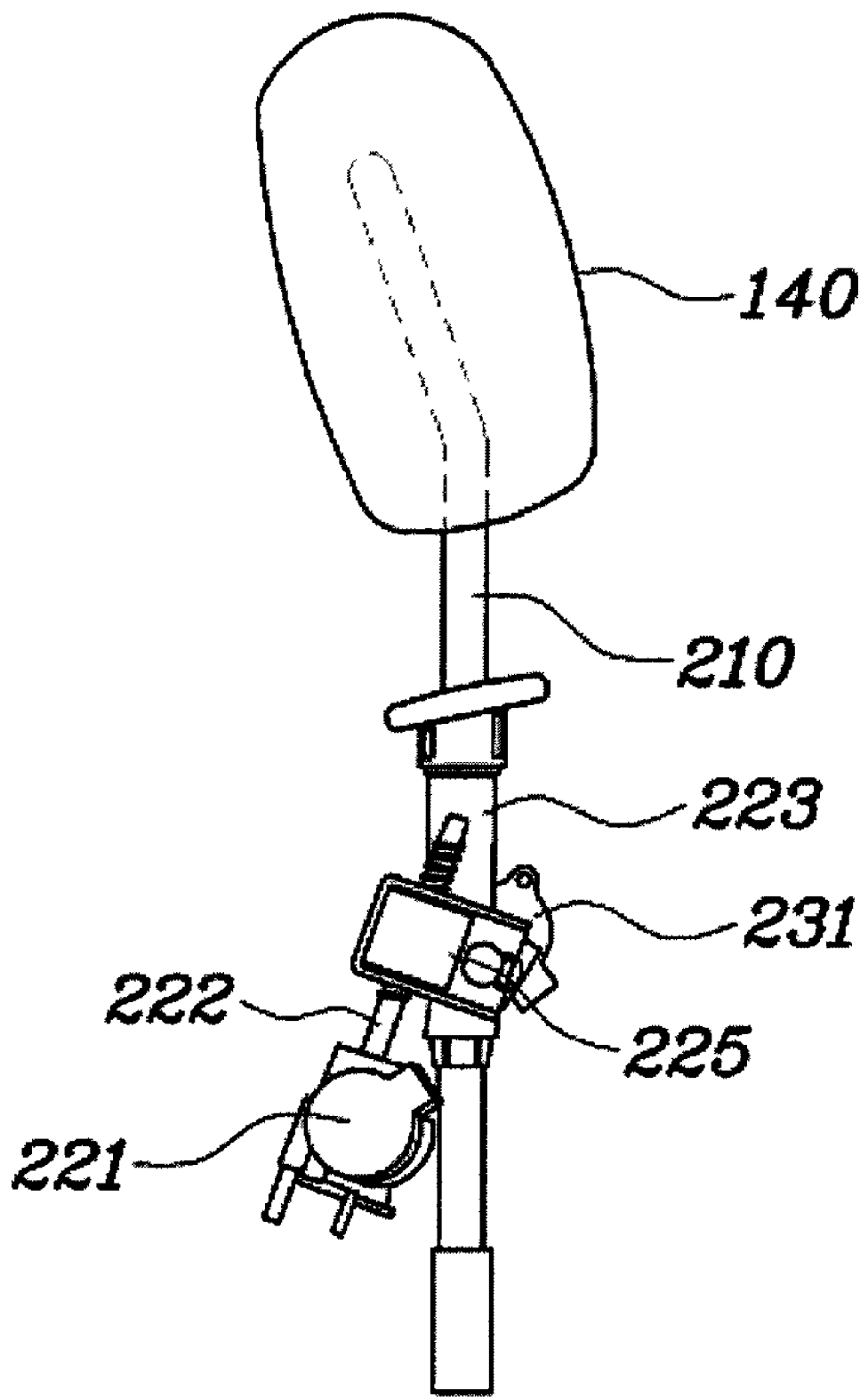

Meanwhile, unless the rear-end collision actually occurs in the state of FIG. 6, the control unit 130 determines that the rear-end collision is not occurring, based on the value measured by the collision prediction sensor 110, and then transmits another control signal to the tilting motor 221 and the vertical moving motor 231 so that the headrest unit 140 returns to its original position.

The tilting motor 221 and the vertical moving motor 231 are rotated backwards in response to the control signal of the control unit 130, thus making the headrest unit 140 and the stay rod 210 return from the position of FIG. 6 to that of FIG. 5.

As described above, the present invention provides an automatic moving apparatus for a pre-crash headrest, in which the headrest rapidly moves forwards and upwards in the event of a rear-end collision to come as close as possible to a passenger's head, thus stably supporting his or her head right behind the head when the rear-end collision occurs, therefore preventing his or her head from abruptly bending backwards and considerably reducing injuries to his or her neck.

For convenience in explanation and accurate definition in the appended claims, the terms "upper", "lower", "inner", "outer", "upwards", "downwards", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic moving apparatus for a pre-crash headrest, comprising:

a collision prediction sensor provided on a rear of a vehicle to predict a rear-end collision;

a control unit comparing a value measured by the collision prediction sensor and input to the control unit, with a reference value stored in the control unit, and outputting a control signal when it is determined that the value measured by the collision prediction sensor is higher than the reference value; and a headrest moving unit moving a headrest unit toward a passenger's head before the headrest unit comes into contact with the passenger's head when the control signal is input from the control unit to the headrest moving unit, and comprising:
- a stay rod connected at an upper end thereof to the headrest unit, both sides of the stay rod being placed in a vertical direction;
- tilting device tilting the stay rod forwards or backwards relative to a seatback in response to the control signal of the control unit, thus making the headrest unit come closer to the passenger's head; and
- vertical moving device moving the stay rod in a vertical direction in response to the control signal of the control unit so that an uppermost end of the headrest unit is not lower than the passenger's head.

2. The automatic moving apparatus as set forth in claim 1, wherein the control unit receives a signal from a head position sensor provided on a front of the headrest unit to provide a position of the passenger's head, thus preventing the headrest unit from coming into contact with the passenger's head.

3. The automatic moving apparatus as set forth in claim 2, wherein the head position sensor comprises a capacitive sensor which varies capacitance depending on a distance between the sensor and the passenger's head.

4. The automatic moving apparatus as set forth in claim 1, wherein the tilting device comprises:
- a tilting motor driven by the control unit;
- a tilting lead screw rotatably coupled to the tilting motor in a gear coupling manner, with a thread formed on an outer circumference of the tilting lead screw;
- a guide part slidably fitted over a vertical part of the stay rod to provide a rotating force of the tilting motor to the stay rod and guide a vertical movement of the stay rod;
- a hinge shaft secured to the guide part to transmit the rotating force of the tilting motor to the guide part; and
- a connecting arm fitted at a first end thereof over the tilting lead screw, and fitted at a second end thereof over the hinge shaft to rotate the hinge shaft using a rotating force of the tilting lead screw.

5. The automatic moving apparatus as set forth in claim 4, wherein the vertical moving device comprises:
- a vertical moving motor fixed to the hinge shaft and driven by the control unit;
- a vertical moving lead screw rotatably coupled to the vertical moving motor in a gear coupling manner, with a thread formed on an outer circumference of the vertical moving lead screw; and
- a vertical moving body rotatably engaged at a first side thereof to the vertical moving lead screw to move in a vertical direction by a rotation of the vertical moving lead screw, both side ends of the vertical moving body being coupled to a lower portion of the stay rod to transmit a vertical moving force to the stay rod.

6. The automatic moving apparatus as set forth in claim 5, wherein the vertical moving motor is mounted on the hinge shaft via a mounting bracket.

7. The automatic moving apparatus as set forth in claim 6, wherein the vertical moving body is slidably guided by a guide rod which is placed to the mounting bracket in a vertical direction and slidably inserted into the vertical moving body.

8. The automatic moving apparatus as set forth in claim 1, wherein the collision prediction sensor comprises a radar sensor.

9. The automatic moving apparatus as set forth in claim 2, wherein the headrest moving unit moves the headrest unit so that the headrest unit is spaced apart from the passenger's head by 1 to 20 mm.

\* \* \* \* \*